United States Patent [19]

Wilkinson et al.

[11] Patent Number: 6,074,773

[45] Date of Patent: Jun. 13, 2000

[54] IMPREGNATION OF MICROPOROUS ELECTROCATALYST PARTICLES FOR IMPROVING PERFORMANCE IN AN ELECTROCHEMICAL FUEL CELL

[75] Inventors: David P. Wilkinson, North Vancouver; Stephen A. Campbell, Maple Ridge; Joy A. Roberts, Burnaby, all of Canada

[73] Assignee: Ballard Power Systems Inc., Burnaby, Canada

[21] Appl. No.: 09/036,389

[22] Filed: Mar. 6, 1998

[51] Int. Cl.$^7$ .............................. H01M 4/86; H01M 4/90; H01M 4/96; B05D 1/12

[52] U.S. Cl. .............................. 429/41; 429/30; 429/44; 429/45; 427/180

[58] Field of Search .................................. 429/30, 41, 44, 429/45; 427/180

[56] References Cited

U.S. PATENT DOCUMENTS

| | | | |
|---|---|---|---|
| 3,769,093 | 10/1973 | Jones | 136/120 FC |
| 4,500,395 | 2/1985 | Nakamura | 204/284 |
| 5,185,218 | 2/1993 | Brokman et al. | 429/27 |
| 5,186,877 | 2/1993 | Watanabe | 264/104 |
| 5,346,780 | 9/1994 | Suzuki | 429/42 |
| 5,501,915 | 3/1996 | Hards et al. | 429/42 |
| 5,766,788 | 6/1998 | Inoue et al. | 429/42 |

FOREIGN PATENT DOCUMENTS

| | | |
|---|---|---|
| 0 305 565 | 3/1989 | European Pat. Off. . |
| 0 520 469 A2 | 12/1992 | European Pat. Off. . |
| 2 385 228 | 10/1978 | France . |
| 2 404 312 | 4/1979 | France . |
| 61-067789 | 4/1986 | Japan . |
| 7-176310 | 7/1995 | Japan . |
| 9-320611 | 12/1997 | Japan . |
| WO 96/12317 | 4/1996 | WIPO . |

OTHER PUBLICATIONS

Uchida, et al., Investigation of the Microstructure in the Catalyst Layer and Effects of both Perfluorosulfonate Ionomer and PTFE–Loaded Carbon on the Catalyst Layer of Polymer Electrolyte Fuel Cells, *J. Electrochem. Soc.,* 142(12):4143–4149 (Dec., 1995).

Uchida, et al., "Effects of Microstructure of Carbon Support in the Catalyst Layer on the Performance of Polymer–Electrolyte Fuel Cells," *Journal of the Electrochemical Society,* 143(7):2245–2252 (Jul., 1996).

Watanabe, et al., "Experimental Analysis of the Reaction Layer Structure in a Gas Diffusion Electrode," *Journal of Electroanalytical Chemistry* 195:81–93 (1985) no month available.

Webster's II New Riverside University Dictionary, pp. 615 and 875, 1988 no month available.

*Primary Examiner*—Kathryn Gorgos
*Assistant Examiner*—Edna Wong
*Attorney, Agent, or Firm*—McAndrews, Held & Malloy, Ltd.

[57] ABSTRACT

A method is provided for treating electrocatalyst particles and using the treated electrocatalyst for improving performance in an electrochemical fuel cell. The treatment method comprises impregnating pores of the electrocatalyst particles with an impregnant wherein the pores comprise micropores which have an aperture size less than 0.1 micron. The impregnant is preferably ion-conducting and may comprise an organic acid, an inorganic acid, or a polymer. Alternatively, or in addition, the impregnant has an oxygen permeability greater than that of water. The method of impregnating the electrocatalyst particles preferably comprises the steps of contacting the electrocatalyst particles with an impregnant and subjecting the electrocatalyst particles to a vacuum and/or an elevated pressure above atmospheric pressure. The treated electrocatalyst particles are incorporated into an electrochemical fuel cell. The impregnant improves the mass transport properties for the movement of reactants and reaction products within the micropores of the electrocatalyst particles, thereby improving electrocatalyst utilization and electrochemical fuel cell performance for a fixed amount of electrocatalyst.

21 Claims, 4 Drawing Sheets

IMPREGNATION OF MICROPOROUS ELECTROCATALYST PARTICLES FOR IMPROVING PERFORMANCE IN AN ELECTROCHEMICAL FUEL CELL

TECHNICAL FIELD

The present invention relates to porous electrocatalyst particles which may be incorporated into an electrochemical cell. More particularly, the invention provides a method for improving electrochemical fuel cell performance by impregnating porous electrocatalyst particles and incorporating such particles into an electrochemical fuel cell.

BACKGROUND

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst is needed to induce the desired electrochemical reactions at the electrodes. In addition to electrocatalyst the electrodes may also comprise an electrically conductive substrate upon which the electrocatalyst is deposited. The electrocatalyst may be a metal black (namely, a substantially pure, unsupported, finely divided metal or metal powder) an alloy or a supported metal catalyst, for example, platinum on carbon particles.

A solid polymer fuel cell is a type of electrochemical fuel cell which employs a membrane electrode assembly ("MEA"). The MEA comprises a solid polymer electrolyte or ion-exchange membrane disposed between the two electrode layers.

A broad range of reactants can be used in electrochemical fuel cells. For example, the fuel stream may be substantially pure hydrogen gas, a gaseous hydrogen-containing reformate stream, or methanol in a direct methanol fuel cell. The oxidant may be substantially pure oxygen or a dilute oxygen stream such as air.

The electrochemical oxidation which occurs at the anode electrocatalyst of a solid polymer electrochemical fuel cell, results in the generation of cationic species, typically protons, and electrons. For an electrochemical fuel cell to utilize the ionic reaction products, the ions must be conducted from the reaction sites at which they are generated to the electrolyte. Accordingly, the electrocatalyst is typically located at the interface between each electrode and the adjacent electrolyte.

Effective electrocatalyst sites are accessible to the reactant, are electrically connected to the fuel cell current collectors, and are ionically connected to the fuel cell electrolyte. For example, if the fuel stream supplied to the anode is hydrogen, electrons and protons are generated at the anode electrocatalyst. The electrically conductive anode is connected to an external electric circuit which conducts an electric current from the anode to the cathode. The electrolyte is typically a proton conductor, and protons generated at the anode electrocatalyst migrate through the electrolyte to the cathode. Electrocatalyst sites which are ionically isolated from the electrolyte are not productively utilized if the protons do not have a means for being ionically transported to the electrolyte. Accordingly, coating the exterior surfaces of the electrocatalyst particles with ionically conductive coatings has been used to increase the utilization of electrocatalyst exterior surface area and increase fuel cell performance by providing improved ion conducting paths between the electrocatalyst surface sites and the electrolyte.

A measure of electrochemical fuel cell performance is the voltage output from the cell for a given current density. Higher performance is associated with a higher voltage output for a given current density or higher current density for a given voltage output. Increasing effective utilization of the electrocatalyst surface area enables the same amount of electrocatalyst to induce a higher rate of electrochemical conversion in a fuel cell resulting in improved performance.

Electrocatalyst materials used in electrochemical fuel cells typically comprise noble metals such as platinum. These materials are expensive, so in addition to improving performance, the present method may also be used to reduce the amount of noble metal used in an electrochemical fuel cell thereby reducing material costs.

U.S. Pat. Nos. 5,186,877 and 5,346,780, disclose methods of coating the exterior surfaces of electrocatalyst particles with a proton conductive film such as an ionomer to improve ionic conductivity between the electrocatalyst and the electrolyte. Known methods of applying exterior coatings to electrocatalyst particles include brush coating and using electrocatalyst/ionomer inks.

In conventional methods, the amount of ionomer coating on the electrocatalyst particles is controlled because too much ionomer can result in reduced electrocatalyst utilization due to poor electrical conductivity and/or reduced reactant accessibility to the electrocatalyst sites. Higher reactant accessibility is preferred to allow the reactants to access the electrocatalyst surfaces at a rate which will sustain the desired electrochemical reaction. As described above, too little ionomer can result in reduced proton conductivity and reduced electrocatalyst utilization.

A problem with conventional methods of coating electrocatalyst particles with ionomers is that they do not effectively impregnate the pores of electrocatalyst particles, especially where pores have aperture sizes less than 0.1 micron (hereinafter defined as micropores). Interior surface areas are defined as those surface areas which form the walls of cracks or pores in the electrocatalyst particles. When porous electrocatalyst particles which have been coated by conventional methods are used in electrochemical fuel cells, a significant portion of the electrocatalyst interior volume and the corresponding interior surface areas are not utilized.

Another problem with conventional methods is that the coatings applied to the electrocatalyst particles may actually obscure or block the pore openings. If micropore openings are blocked, reactants may be prevented from entering the micropores and accessing interior surface areas of the electrocatalyst particles, reducing electrocatalyst utilization and diminishing fuel cell performance.

Complete utilization of the electrocatalyst particle surfaces is limited in part by mass transport limitations within the pores of porous electrocatalyst particles. Thus there is a need for a method of improving the mass transport properties to enhance the reactant accessibility and ionic conductivity within the pores of the electrocatalyst particles.

SUMMARY OF THE INVENTION

The invention provides a method of treating porous electrocatalyst particles and the use of the treated particles for improving performance in an electrochemical fuel cell. The treatment of the electrocatalyst particles comprises impregnating pores of the electrocatalyst particles with an impregnant, and in particular, impregnating micropores having an aperture size less than 0.1 micron. The method of improving electrochemical fuel cell performance comprises incorporating the treated porous electrocatalyst particles in an electrochemical fuel cell at an interface between an electrode and an electrolyte in the fuel cell. The impregnant is selected to improve reactant and/or ion transport properties within the micropores of the electrocatalyst particles.

An impregnant is defined as a material which has been deposited within the micropores of electrocatalyst particles. Such impregnants are preferably introduced into the micropores as a liquid, but may be introduced in any phase depending upon the properties of the particular impregnant. The impregnant may be a homogenous material or a mixture of different materials which may be in different phases. For example, the impregnant may comprise a solid material which is suspended in a liquid material.

The impregnant preferably comprises an ion-conducting material. Many types of ion-conducting materials are suitable, so long as they are compatible with the operating environment and other components of electrochemical fuel cells. For example, the ion-conducting material may be an inorganic acid, such as $H_3PO_4$, and $HNO_3$, or an organic acid, such as fluorinated organic acids like $CF_3COOH$, and $CF_3SO_3H$, or a polymer, such as perfluorosulfonic acid (NAFION® brand perfluorosulfonic acid) or a sulfonated trifluorostyrene based polymer.

If the electrocatalyst is to be used at the cathode of an electrochemical fuel cell, the impregnant preferably comprises a material with oxygen permeability greater than that of water. Dilute oxygen is the oxidant which is typically used in acid electrochemical fuel cells. Improving oxygen permeability within a fuel cell results in improved mass transport properties for transporting the oxidant to the cathode electrocatalyst sites. Accordingly, impregnating the electrocatalyst micropores with a material which has an oxygen permeability greater than that of water, improves the transport of oxygen to interior electrocatalyst surface areas and increases utilization of interior electrocatalyst sites. Thus the impregnant may comprise an organic fluid which has these properties, such as, for example, organic fluids selected from the group consisting of hydrocarbons, fluorocarbons, and non-halogenated oils. Where the organic fluid is a fluorocarbon, it may be a perfluorocarbon, such as perfluorotripropylamine, cis-perfluorodecalin, trans-perfluorodecalin, perfluoro-1-methyl decalin, perfluorotributylamine, perfluoroisopentyltetrahydropyrane, perfluoro-N,N-dimethylcyclohexylamine, or perfluoroperhydrophenanthrene. Where the organic fluid is a non-halogenated oil, it may be a silicone oil or a mineral oil.

An embodiment of the method of improving electrochemical fuel cell performance comprises incorporating porous electrocatalyst particles in an electrochemical fuel cell at an interface between an electrode and an electrolyte wherein the particles have been subjected to a vacuum to impregnate pores in the particles with an impregnant.

A preferred method of impregnating porous electrocatalyst particles to deposit an impregnant within micropores thereof, comprises contacting the electrocatalyst particles with an impregnant at a pressure above or below atmospheric pressure. For example, the electrocatalyst particles may be subjected to reduced pressure or a vacuum to evacuate the pores thereof and then contacted with the impregnant, or the electrocatalyst particles may be subjected to a vacuum in the presence of the impregnant. Alternatively, elevated pressure may be used to facilitate penetration of the impregnant into the micropores.

The method may also comprise subjecting the electrocatalyst particles sequentially to both a vacuum and an elevated pressure (above atmospheric pressure) to enhance the penetration of the impregnant within micropores. The method may be applied to particles of carbon-supported electrocatalysts or to unsupported electrocatalysts.

The product of the present electrocatalyst treatment method may be incorporated into an electrochemical fuel cell. An electrochemical fuel cell comprises an anode, a cathode, and an electrolyte disposed between the anode and the cathode. The treated electrocatalyst particles are preferably disposed at the interface between the electrolyte and either or both of the anode and cathode. Conventional methods of coating the electrocatalyst particle exterior surface areas, such as, for example, NAFION® brand perfluorosulfonic acid brush coating of the electrodes, may be used in combination with the present impregnation of the pores in the electrocatalyst particles.

Several advantages may be achieved by practicing the described method. For example, compared to electrochemical fuel cells which incorporate untreated electrocatalyst particles, improved electrochemical fuel cell performance is achieved by incorporating electrocatalyst particles which have been treated in accordance with the described impregnation method. It is believed that the impregnant improves utilization of interior electrocatalyst surface areas within the micropores by improving mass transport properties within the micropores for reactants and/or products of the electrocatalyst induced reactions.

A benefit of increasing electrocatalyst utilization is that it provides options for improving electrochemical fuel cell performance and/or reducing material costs by using lesser amounts of electrocatalyst.

Another advantage is that, in addition to increasing electrocatalyst utilization, the method can also be used to improve other aspects of electrochemical fuel cell performance. For example, an impregnant may be selected to impart additional desirable properties such as preferential reactivity under cell reversal conditions, selective oxidation of electrocatalyst poisons, hydrophobicity, and hydrophilicity. For example, an impregnant could comprise an organometallic macrocyclic such as cobalt phthalocyanine which may be preferentially reactive under cell reversal conditions to prevent permanent damage to fuel cell components. A hydrophobic material such as polytetrafluoroethylene (PTFE) may be used as the impregnant or as part of an impregnant mixture to reduce water penetration of the electrocatalyst micropores, which might inhibit the access of reactants to the interior sites.

The desired properties within the electrocatalyst micropores of a particular electrochemical fuel cell may depend upon a number of factors such as, for example, the type of reactants and the anticipated operating conditions. The method and product of the invention provide a means for modifying the properties within the electrocatalyst micropores.

BRIEF DESCRIPTION OF THE DRAWINGS

The advantages, nature and additional features of the invention will become more apparent from the following description, together with the accompanying Figures, in which.

DETAILED DESCRIPTION OF THE PREFERRED EMBODIMENTS

Figure 1:
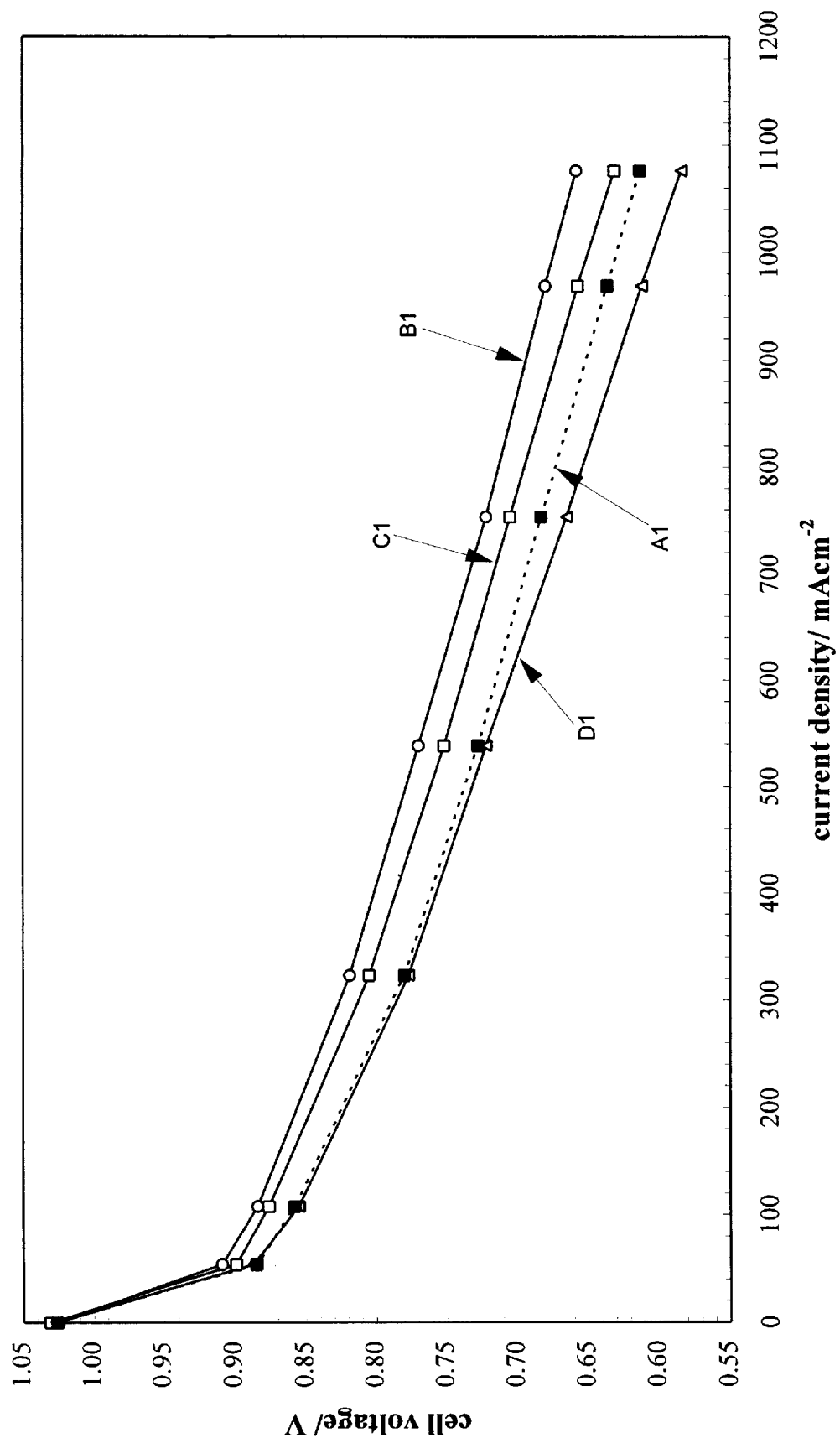
FIG. 1 is a graph showing plots of cell voltage versus current density (polarization curves) for one prior art electrochemical fuel cell and three fuel cells incorporating impregnated electrocatalyst particles, each using a different impregnant. All four electrochemical fuel cells have the same loading of 20% platinum on carbon electrocatalyst.

The present invention provides a method for treating electrocatalyst particles and using the treated electrocatalyst to improve performance in an electrochemical fuel cell. A preferred treatment method comprises impregnating micropores of the electrocatalyst particles with a fluid which remains in the micropores as an impregnant. The impregnant preferably facilitates transport of reactants and/or reactant products within the micropores. Accordingly, the impregnant may comprise an ionically conductive material and/or a material having an oxygen permeability greater than that of water.

The impregnant may be selected to provide a plurality of beneficial properties. For example $CF_3(CF_2)_nSO_3H$ could be selected as the impregnant to provide both improved ion conductivity and improved oxygen solubility. Alternatively, the impregnant may comprise a mixture of different materials which together yield the desired properties.

Preferably, the impregnant is chosen from materials which are compatible with the internal environment of an electrochemical fuel cell. A compatible impregnant is defined as a material which will not react undesirably with process fluids or the electrochemical fuel cell components during the operational lifetime of the electrochemical fuel cell.

A preferred method of facilitating penetration of the impregnant into the pores of the electrocatalyst is to subject the particles to a vacuum and/or elevated pressures above atmospheric pressure. The impregnant may be selected with consideration to its physical and chemical molecular structure for facilitating the impregnation of the micropores with the impregnant.

In a preferred method, an impregnant is impregnated into the micropores of the electrocatalyst particles before the particles are deposited on an electrode substrate. For example, the electrocatalyst particles may be impregnated, and then deposited onto an electrode substrate or an ion exchange membrane in an ink or paste formulation.; then none of the micropores are obscured by the substrate during the impregnation step. The method may be applied to electrocatalyst particles which have been deposited on an electrode substrate or in-situ in an assembled fuel cell, but then the electrode substrate may interfere with the impregnation of some of the micropores.

Tests were performed on two different types of electrocatalyst particles: (1) 20% SHAWINIGAN; and (2) 40% Pt/XC72R. Both of these types of electrocatalyst particles were obtained from Johnson Matthey PLC. SHAWINIGAN® is a trademark of Chevron U.S.A. Inc., and is used herein to identify the generic product "acetylene carbon black". Thus, the expression "20% Pt/Shawinigan" means an electrocatalyst comprising 20% platinum (by weight) supported on acetylene carbon black particles. "XC72R is a trade name for a furnace carbon black. Thus, the expression "40%Pt/XC72R" means an electrocatalyst comprising 40% platinum (by weight supported on furnace carbon black particles. The 20% Pt/SHAWINIGAN electrocatalyst particles were not subjected to any pretreatment preparations, however, the 40% Pt/XC72R electrocatalyst was ground before being impregnated.

Both types of electrocatalyst particles were vacuum impregnated with three different impregnants, namely neat perfluorotributylamine, 5 M $H_3PO_4$, and 5 weight per cent NAFION® brand perfluorosulfonic acid (EW 1100) in alcohol. The impregnated electrocatalyst particles were prepared by mixing 5 grams of the electrocatalyst particles with about 50 ml of the particular impregnant. The mixture was agitated in an ultrasound bath and then subjected to a vacuum until the mixture bubbled vigorously. After the vacuum treatment, the mixture was decanted and the impregnated electrocatalyst particles were separated using a filter.

When perfluorotributylamine was used as the impregnant, additional perfluorotributylamine was added to the mixture to reduce the viscosity. The mixture was placed under vacuum for a total of 3 hours. The filtered impregnated electrocatalyst particles were not washed.

When $H_3PO_4$ was used as the impregnant, the electrocatalyst and $H_3PO_4$ mixture was left under vacuum for a total of 3 hours. The impregnated electrocatalyst particles were washed with water after being separated from the excess liquid impregnant.

When NAFION® brand perfluorosulfonic acid was used as the impregnant, water was added to the electrocatalyst and NAFION® brand perfluorosulfonic acid mixture to reduce the viscosity. The mixture was kept under vacuum for 1.75 hours after which time the mixture stopped degassing. The impregnated electrocatalyst particles were washed with water after being separated from the excess liquid impregnant.

All vacuum impregnated electrocatalyst particles were dried in an oven prior to being mixed with a water and 5 weight per cent NAFION® brand perfluorosulfonic acid in alcohol to make a NAFION® brand perfluorosulfonic acid ink. The NAFION® brand perfluorosulfonic acid ink was spread onto a major surface of each of anode and cathode carbon fiber paper substrate to provide a cathode catalyst loading of 0.68 mg Pt/cm$^2$ and an anode catalyst loading of about 0.3 mg Pt/cm$^2$. A solid polymer electrolyte membrane was positioned between the coated electrode surfaces and the membrane electrode assembly was bonded together using heat and pressure. For each of the two electrocatalyst types a fourth membrane electrode assembly was prepared using unimpregnated electrocatalyst particles, but the same NAFION® brand perfluorosulfonic acid and platinum loading.

The prepared membrane electrode assemblies were put into electrochemical fuel cells and the performance of the vacuum impregnated electrocatalyst particles was measured under the following operating conditions:

Fuel: hydrogen
Fuel pressure: 30 psig
Fuel stoichiometry: 1.5
Oxidant: oxygen
Oxidant pressure: 30 psig
Oxidant stoichiometry: 10.0
Fuel cell temperature: 80° C.

Measurements were taken from the operating electrochemical fuel cells to provide the data for the graphs in FIGS. 1 through 4. Steady state polarization tests yielded the data for the polarization curves (FIGS. 1 and 3) and cyclic voltammetry tests yielded the data for the bar charts (FIGS. 2 and 4) which show the effective platinum surface area ("EPSA") for the electrocatalyst particles which were treated with different impregnants. EPSA is calculated as the loading in mg/cm$^2$ multiplied by the catalyst electrochemical area in cm$^2$/mg and the percentage utilization. A higher EPSA is desirable since this is an indicator of catalyst surface area which is used in electrochemical reactions. However, EPSA alone is not determinative of fuel cell performance because other factors, such as the permeability of the impregnant, are also important. The results of the tests are discussed below.

EXAMPLE 1

Figure 2:
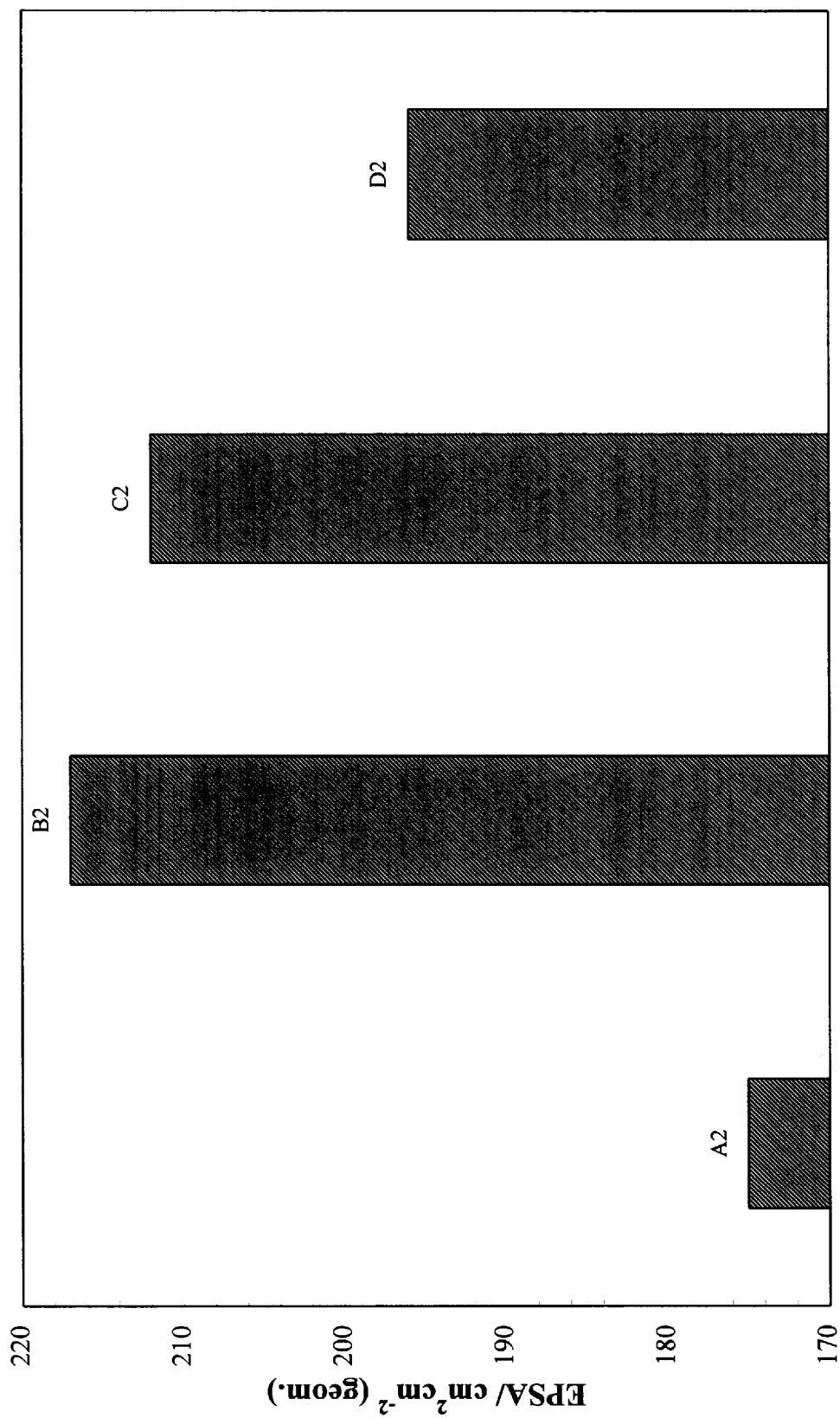
FIG. 2 is a bar chart which shows the effective platinum surface area for the four electrochemical fuel cells of FIG. 1.

FIGS. 1 and 2 were produced from data measured from four electrochemical fuel cells which used 20% Pt/SHAWINIGAN electrocatalyst particles. The four electrochemical fuel cells were all made in substantially the same way except for the treatment of the electrocatalyst particles. Three of the electrochemical fuel cells used electrocatalyst particles which were vacuum impregnated with an impregnant. A different impregnant was used for each one of the three electrochemical fuel cells, namely perfluorotributylamine, $H_3PO_4$, and NAFION® brand perfluorosulfonic acid. The fourth electrochemical fuel cell used electrocatalyst particles which were not vacuum impregnated, but which were deposited on the electrode substrate in a NAFION® brand perfluorosulfonic acid ink.

FIG. 1 is a plot of cell voltage versus current density for the four electrochemical fuel cells. Plot A1 is a plot of the performance measured for an electrochemical fuel cell using electrocatalyst particles which were not vacuum impregnated. Plot A1 represents the performance achieved by a prior art electrochemical fuel cell using untreated 20%/SHAWINIGAN electrocatalyst particles deposited in a NAFION® brand perfluorosulfonic acid ink solution. FIG. 1 shows that an improvement in electrochemical fuel cell performance can be attained by using vacuum impregnated electrocatalysts. In accordance with a preferred method of the present invention, the electrocatalyst particles were pre-treated prior to deposition on to an electrode support. The most improved performance was observed for the electrochemical fuel cell which used electrocatalyst particles vacuum impregnated with perfluorotributylamine (Plot B1). The next best performance was measured for the electrochemical fuel cell which used electrocatalyst particles vacuum impregnated with $H_3PO_4$ (Plot C1). For the fuel cell which used electrocatalyst particles vacuum impregnated with NAFION® brand perfluorosulfonic acid, (Plot D1), for current densities higher than 400 mA/cm$^2$ there was a decrease in the performance levels, compared to the electrochemical fuel cell which used the untreated electrocatalyst (Plot A1).

FIG. 2 is a chart which shows the EPSA for the four electrochemical fuel cells. Bar A2 represents the EPSA for the conventional untreated electrocatalyst particles. Bar B2 represents the EPSA for the electrocatalyst particles which were vacuum impregnated with perfluorotributylamine. Bar C2 represents the EPSA for the electrocatalyst particles which were vacuum impregnated with $H_3PO_4$. Bar D2 represents the EPSA for the electrocatalyst particles which were vacuum impregnated with NAFION® brand perfluorosulfonic acid. FIG. 2 shows that all of the electrocatalyst particles which were vacuum impregnated with an impregnant yielded higher EPSAs compared to the untreated electrocatalyst particles which had an EPSA of 175 cm$^2$/cm$^2$ (Bar A2). The electrocatalyst particles impregnated with perfluorotributylamine had the highest EPSA, measured at 217 cm$^2$/cm$^2$ (Bar B2).

EXAMPLE 2

Figure 3:
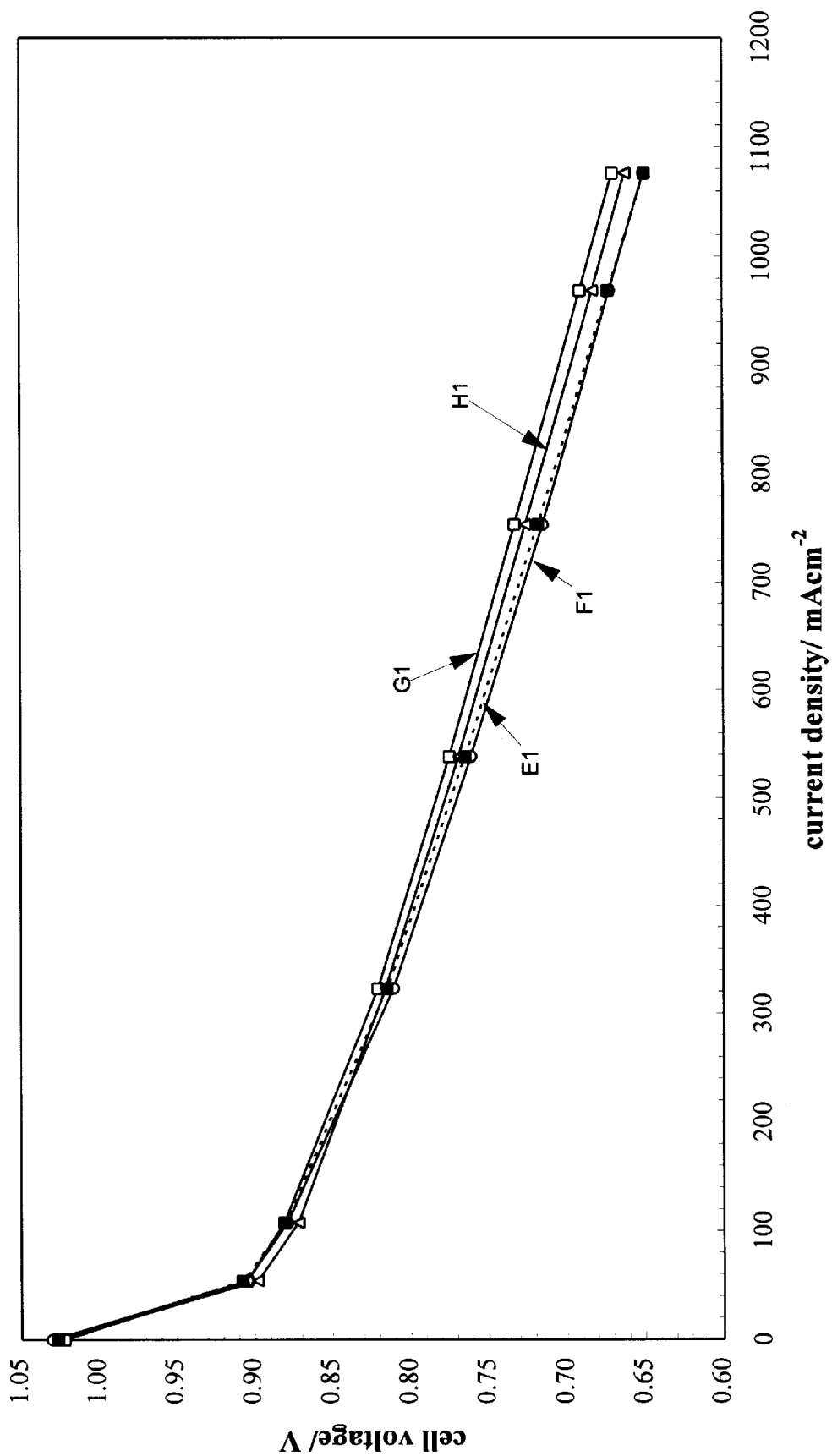
FIG. 3 is a graph showing polarization curves for one prior art electrochemical fuel cell and three fuel cells incorporating impregnated electrocatalyst particles, each using a different impregnant. All four electrochemical fuel cells have the same loading of 40% platinum on carbon electrocatalyst.
Figure 4:
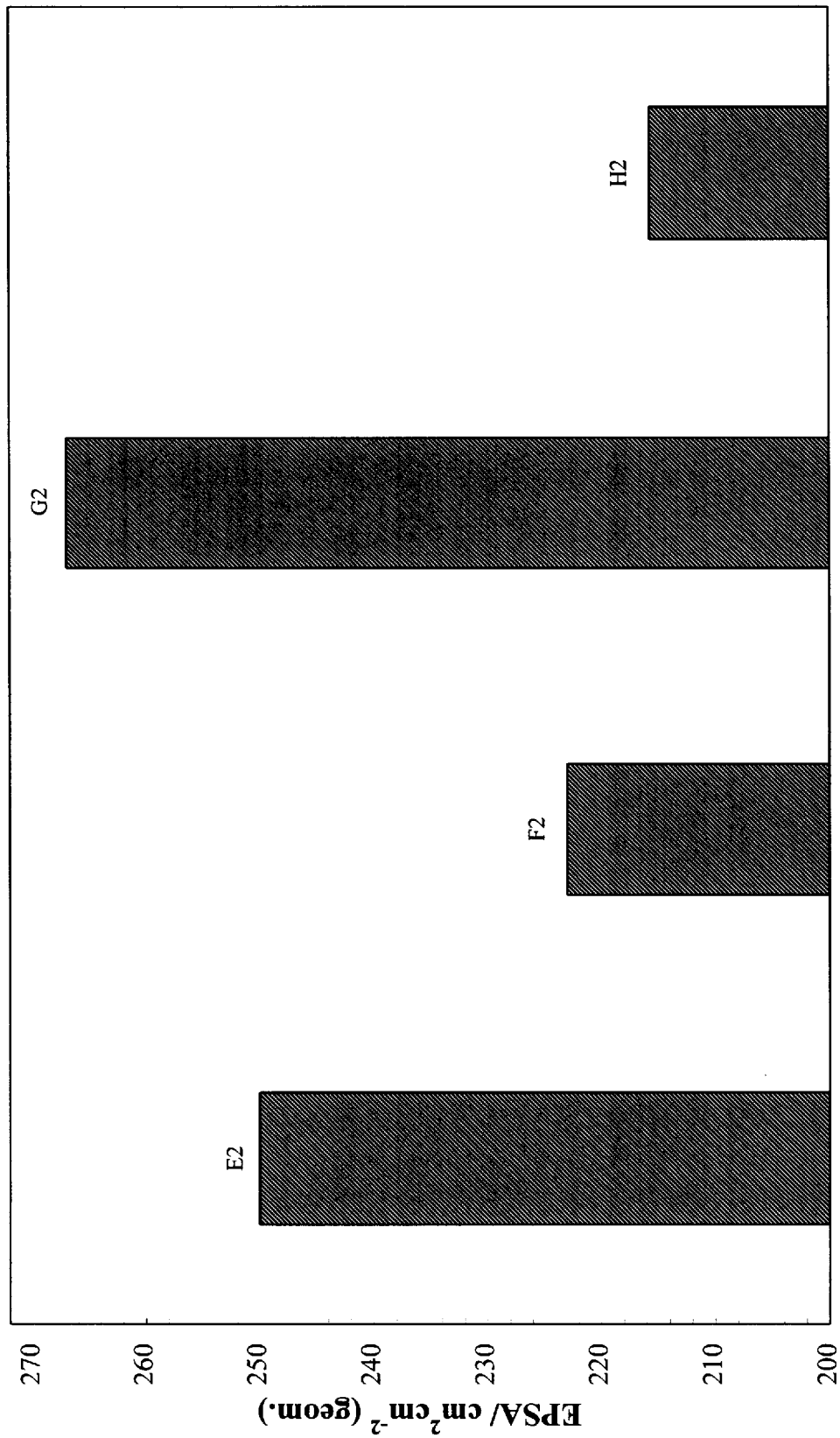
FIG. 4 is a bar chart which shows the effective platinum surface area for the four electrochemical fuel cells of FIG. 3.

FIGS. 3 and 4 were produced from data measured from four electrochemical fuel cells which used 40% Pt/XC72R electrocatalyst particles. The four electrochemical fuel cells were all made in substantially the same way except for the treatment of the electrocatalyst particles. Three of the electrochemical fuel cells used electrocatalyst particles which were vacuum impregnated with an impregnant. Like in the first example, a different impregnant was used for each one of the three electrochemical fuel cells, namely $H_3PO_4$, NAFION® brand perfluorosulfonic acid, and perfluorotributylamine. The fourth electrochemical fuel cell used electrocatalyst particles which were not vacuum impregnated, but which were deposited on the electrode substrate in a NAFION® brand perfluorosulfonic acid ink.

FIG. 3 is a plot of cell voltage versus current density for the four electrochemical fuel cells which used 40% Pt/XC72R electrocatalyst particles. Plot E1 represents the performance achieved by a prior art electrochemical fuel cell using untreated 40% Pt/XC72R electrocatalyst particles deposited in a NAFION® brand perfluorosulfonic acid ink solution. Plot F1 is a plot of the performance measured for an electrochemical fuel cell using electrocatalyst particles which were vacuum impregnated with perfluorotributylamine. Plot G1 is a plot of the performance measured for an electrochemical fuel cell using electrocatalyst particles which were vacuum impregnated with $H_3PO_4$. Plot H1 is a plot of the performance measured for an electrochemical fuel cell using electrocatalyst particles which were vacuum impregnated with NAFION® brand perfluorosulfonic acid. The polarization curves in FIG. 3 show that the effect of the vacuum impregnation treatment of the 40% Pt/XC72R electrocatalyst particles produced a smaller improvement in fuel cell performance of compared to the treated 20% Pt/SHAWINIGAN electrocatalyst particles. The performance of the electrochemical fuel cell which used electrocatalyst particles impregnated with perfluorotributylamine was essentially the same as the electrochemical fuel cell which used untreated electrocatalyst particles. The electrochemical fuel cells which used $H_3PO_4$ and NAFION® brand perfluorosulfonic acid as the impregnants performed only slightly better than the electrochemical fuel cell which used untreated electrocatalyst. The electrochemical fuel cell using $H_3PO_4$ as the impregnant yielded the best results.

FIG. 4 is a chart which shows the EPSA for the four electrochemical fuel cells which used 40% Pt/XC72R electrocatalyst particles. Bar E2 represents the EPSA for the untreated electrocatalyst particles. Bar F2 represents the EPSA for the electrocatalyst particles which were vacuum impregnated with perfluorotributylamine. Bar G2 represents the EPSA for the electrocatalyst particles which were vacuum impregnated with $H_3PO_4$. Bar H2 represents the EPSA for the electrocatalyst particles which were vacuum impregnated with NAFION® brand perfluorosulfonic acid. The EPSA data for the 40% Pt/XC72R electrocatalyst particles is less conclusive than the EPSA data for the 20% Pt/Shawinigan electrocatalyst particles. However, FIGS. 3 and 4 shows that the 40% Pt/XC72R electrocatalyst particles which were impregnated with $H_3PO_4$ had the highest EPSA and yielded the highest performance.

Examples 1 and 2 show that improved performance may be achieved by using a vacuum impregnated electrocatalyst in an operating electrochemical fuel cell. A general observation from the results obtained using $H_3PO_4$ and NAFION® brand perfluorosulfonic acid as impregnants is that the impregnant with the smaller molecular weight yielded better results when used to impregnate either the 20% Pt/SHAWINIGAN or the 40% Pt/XC72R electrocatalyst.

At 25° C. the solubility of air in water is 1.9 ml/100 ml whereas, at the same temperature, the solubility of air in perfluorotributlyamine is 27. Perfluorotributylamine is not an ionically conductive, so the results from the tests using 20% Pt/SHAWINIGAN electrocatalyst particles impregnated with perfluorotributylamine demonstrate that improving oxygen permeability within the electrocatalyst micropores is an important factor in improving electrochemical fuel cell performance.

Improvements in performance were also observed for the same electrochemical fuel cells which incorporated the treated electrocatalyst particles and which used air as the oxidant, particularly for current densities less than 500 $mA/cm^2$.

While the present invention has been described in the context of electrochemical fuel cells, the method and product of the invention may offer advantages in other electrochemical apparatuses which use electrocatalyst particles to induce a desired reaction.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of improving electrochemical fuel cell performance, the method comprising incorporating porous electrocatalyst particles in said electrochemical fuel cell at an interface between an electrode and an electrolyte, wherein micropores in said electrocatalyst particles have been impregnated with an impregnant which comprises an ion-conducting material that is an acid.

2. The method of claim 1 wherein said ion-conducting material is an inorganic acid.

3. The method of claim 2 wherein said inorganic acid is selected from the group consisting of $H_3PO_4$ and $HNO_3$.

4. The method of claim 1 wherein said ion-conducting material is an organic acid.

5. The method of claim 4 wherein said organic acid is a fluorinated organic acid.

6. The method of claim 4 wherein said organic acid is selected from the group consisting of $CF_3COOH$, and $CF_3SO_3H$.

7. The method of claim 4 wherein said electrolyte is an ion-exchange membrane.

8. The method of claim 1 wherein said impregnant is hydrophobic.

9. The method of claim 1 wherein said electrocatalyst is a carbon-supported electrocatalyst.

10. A method of improving electrochemical fuel cell performance, the method comprising incorporating porous electrocatalyst particles in said electrochemical fuel cell at an interface between an electrode and an electrolyte, wherein micropores in said electrocatalyst particles have been impregnated with an impregnant which comprises an organic fluid which is a perfluorocarbon, wherein said organic fluid with oxygen permeability greater than that of water and wherein said perfluorocarbon is selected from the group consisting of perfluorotripropylamine, cis-perfluorodecalin, trans-perfluorodecalin, perfluoro-1-methyl decalin, perfluoroisopentyltetrahydropyrane, perfluoro-N,N-dimethylcyclohexylamine, perfluoroperhydrophenanthrene, and perfluorotributylamine.

11. A method of improving electrochemical fuel cell performance, the method comprising incorporating porous electrocatalyst particles in said electrochemical fuel cell at an interface between an electrode and an electrolyte, wherein micropores in said electrocatalyst particles have been impregnated with an impregnant which comprises an organic fluid with oxygen permeability greater than that of water and wherein said organic fluid is silicone oil or mineral oil.

12. A method of impregnating porous electrocatalyst particles to deposit an impregnant within pores thereof having an aperture size less than 0.1 micron, said method comprising contacting said electrocatalyst particles with said impregnant at a pressure below atmospheric pressure, and further comprising contacting said electrocatalyst particles with said impregnant at a pressure above atmospheric pressure.

13. The method of claim 12 wherein said impregnant comprises an ion-conducting material.

14. The method of claim 12 wherein said impregnant comprises a material with oxygen permeability greater than that of water.

15. The method of claim 12 wherein said electrocatalyst is a carbon-supported electrocatalyst.

16. A method of impregnating porous electrocatalyst particles to deposit an impregnant within pores having an aperture size less than 0.1 micron, said method comprising the step of contacting said electrocatalyst particles with said impregnant at a pressure above atmospheric pressure.

17. The method of claim 16 wherein said impregnant comprises an ion-conducting material.

18. The method of claim 16 wherein said impregnant comprises a material with oxygen permeability greater than that of water.

19. The method of claim 16 wherein said electrocatalyst is a carbon-supported electrocatalyst.

20. An electrochemical fuel cell comprising:

a. an anode;

b. a cathode;

c. an electrolyte disposed between said anode and said cathode; and d. electrocatalyst particles disposed at the interfaces between said electrolyte and said anode and said cathode, said electrocatalyst particles comprising an impregnant deposited within pores thereof, said pores comprising micropores having an aperture size less than 0.1 micron, wherein said, impregnant comprises an ion-conducting material that is an acid.

21. The electrochemical fuel cell of claim 20 wherein said electrolyte comprises an ion exchange membrane.

* * * * *